(12) United States Patent
Hartigan, Sr.

(10) Patent No.: US 11,857,824 B2
(45) Date of Patent: Jan. 2, 2024

(54) STRENGTH-TRAINING APPARATUS FOR OUTDOOR USE WITH A HITCH OR GROUND RECEIVER

(71) Applicant: Paul E Hartigan, Sr., Alexandria, VA (US)

(72) Inventor: Paul E Hartigan, Sr., Alexandria, VA (US)

(*) Notice: Subject to any disclaimer, the term of this patent is extended or adjusted under 35 U.S.C. 154(b) by 190 days.

(21) Appl. No.: 17/571,441

(22) Filed: Jan. 7, 2022

(65) Prior Publication Data
US 2023/0218942 A1    Jul. 13, 2023

(51) Int. Cl.
*A63B 21/055* (2006.01)
*A63B 21/06* (2006.01)
*B60D 1/01* (2006.01)
*B60D 1/58* (2006.01)

(52) U.S. Cl.
CPC .......... *A63B 21/0552* (2013.01); *A63B 21/06* (2013.01); *B60D 1/01* (2013.01); *B60D 1/58* (2013.01)

(58) Field of Classification Search
CPC .......................................... A63B 21/02–0557
See application file for complete search history.

(56) References Cited

U.S. PATENT DOCUMENTS

| | | | | |
|---|---|---|---|---|
| 5,558,608 A * | 9/1996 | Hall | A63B 21/4035 | 482/904 |
| 5,626,546 A * | 5/1997 | Little | A63B 21/4001 | 482/904 |
| 5,997,448 A * | 12/1999 | Duba | A63B 21/1681 | 482/121 |
| 6,142,919 A * | 11/2000 | Jorgensen | A63B 21/154 | 482/904 |
| 6,652,425 B1 * | 11/2003 | Martin | A63B 21/154 | 482/57 |
| 7,736,286 B2 * | 6/2010 | Panaiotov | A63B 21/0552 | 482/121 |
| 8,690,742 B1 * | 4/2014 | Herman | A63B 21/0552 | 482/904 |
| 9,295,870 B2 * | 3/2016 | Mikulski | A63B 21/16 | |
| 9,320,934 B1 * | 4/2016 | Pringle | A63B 21/068 | |
| 9,333,822 B1 * | 5/2016 | LaFave | B60R 9/06 | |
| 10,046,712 B1 * | 8/2018 | Foley | B60R 9/06 | |
| 10,307,634 B2 * | 6/2019 | Young | A63B 71/023 | |
| 10,512,813 B1 * | 12/2019 | Hayward | A63B 21/0557 | |
| 10,646,738 B2 * | 5/2020 | Arturo | A63B 23/03541 | |
| 11,529,537 B1 * | 12/2022 | Bravo | A63B 69/20 | |
| 2006/0186638 A1 * | 8/2006 | Varner | A63B 71/023 | 280/506 |
| 2006/0258519 A1 * | 11/2006 | Ardito, III | A63B 21/0552 | 482/121 |
| 2007/0099780 A1 * | 5/2007 | Bowser | A63B 21/00043 | 482/148 |
| 2008/0128463 A1 * | 6/2008 | Bryan | A63B 21/00047 | 224/486 |
| 2009/0187128 A1 * | 7/2009 | Nagabhushan | A63B 21/1609 | 602/18 |

(Continued)

*Primary Examiner* — Nyca T Nguyen
(74) *Attorney, Agent, or Firm* — Steven Rinehart

(57) ABSTRACT

A strength-training device having, in some embodiments, an L-shaped bracket adapted to insert into a hitch assembly on a vehicle, the strength-training device comprising a cruciform and one or more shuttles and anchor points for elongated straps.

9 Claims, 15 Drawing Sheets

(56) References Cited

U.S. PATENT DOCUMENTS

| | | | |
|---|---|---|---|
| 2010/0048368 A1* | 2/2010 | Donofrio | A63B 21/0552 |
| | | | 482/130 |
| 2011/0251025 A1* | 10/2011 | Harker | A63B 21/0442 |
| | | | 482/91 |
| 2014/0018215 A1* | 1/2014 | Donofrio | A63B 21/169 |
| | | | 482/129 |
| 2014/0296037 A1* | 10/2014 | Razzaq | A63B 21/4033 |
| | | | 482/99 |
| 2016/0144258 A1* | 5/2016 | Stephens | A63B 69/36212 |
| | | | 473/409 |
| 2017/0056701 A1* | 3/2017 | Hammett | A63B 21/0428 |
| 2017/0056718 A1* | 3/2017 | Davis | A63B 21/169 |
| 2017/0100624 A1* | 4/2017 | Young | A63B 17/04 |
| 2022/0016470 A1* | 1/2022 | Seamans | A63B 21/16 |

* cited by examiner

STRENGTH-TRAINING APPARATUS FOR OUTDOOR USE WITH A HITCH OR GROUND RECEIVER

BACKGROUND OF THE INVENTION

Field of the Invention

This invention relates to exercise devices, and more particularly relates to strength training devices and systems including resistance training bands and structure adapted to insert into a receiver of a hitch of a vehicle or a receiver recessed into a subgrade surface.

Description of the Related Art

There is an ongoing need for people to engage in regular exercise and recreation which is of well-established value to physical strength and overall health. Many and varied types of exercise devices are known in the art, including various species of resistance devices and systems available to help individuals in their efforts to improve and measure their strength and improve health issues, as well as for physical therapy. Among these devices are dumbbells, barbells, exercise machines, or fixed objects, and many systems which do not emphasize the use of grip strength or building core strength.

Most of these devices are cumbersome and impractical for porting easily. Most of them cannot be used outdoors. Conventional exercise apparati do not replicate or simulate the strength needed for real world activities.

Exercise straps are known in the art in some forms, and typically affix to an elevated structure indoors with a single strap extending downwards, sometimes with a handle.

Resistance bands are likewise known in the art and have become popular among exercisers, personal trainers and physical therapist alike, typically consisting of rubber tubing with handles on one end and a connector at the other end to secure the resistance band to an anchoring device.

There are a number of key deficiencies in these three forms of exercise straps. The present invention allows user to enjoy the benefits of exercise straps without the deficiencies in the prior art. It is therefore desirable that a strength training apparatus for outdoor use in conjunction with a hitch receiver or ground receiver as taught herein.

SUMMARY OF THE INVENTION

From the foregoing discussion, it should be apparent that a need exists for a strength training apparatus for outdoor use with a hitch or ground receiver. Beneficially, such an apparatus would overcome many of the difficulties and inefficiencies expressed above, by providing a strength training apparatus for outdoor use with a hitch or ground receiver.

The present invention has been developed in response to the problems and needs in the art that have not yet been fully solved by currently available apparati and methods. Accordingly, the present invention has been developed to provide a strength training apparatus for outdoor use comprising: an L-shaped bracket having a cantilever adapted to insert into a hitch receiver, the L-shaped bracket further comprising a vertical post affixed at a proximal end to the cantilever, the vertical post comprising a distal end and an open top end adapted to receive an upright; a cruciform adapted to insert into the open top end, the cruciform comprising an upright and one or more crossbeams; and a shuttle adapted to travel vertically on the upright, the shuttle comprises a hook adapted to detachably affix to one or more straps; one or more straps adapted to detachably affix to one or more of an anchor point and a hook; a plurality of handles affixed to the straps.

In some embodiments, the vertical post juts downwardly from the cantilever. The L-shaped bracket may comprise a plurality of anchor points circumscribing a distal end of the vertical post. The upright may comprise a plurality of anchor points circumscribing a distal end thereof.

The crossbeam may comprise two or more shuttles adapted to travel horizontally on the crossbeam. The upright may comprise a jack screw. In various embodiments, the vertical post comprises one or more jack screws. The straps may also comprise inelastic, elongated polymeric materials.

A strength training apparatus for outdoor use comprising: a cruciform adapted to insert into the open top end, the cruciform comprising an upright and one or more crossbeams affixed perpendicularly to the crossbeams; and a first shuttle adapted to travel vertically on the upright, the shuttle comprising a hook adapted to detachably affix to one or more straps; one or more secondary shuttle adapted to travel laterally on the crossbeam(s), the secondary shuttles comprising a hook adapted to detachably affix to one or more straps; one or more straps adapted to detachably affix to one or more of an anchor point and a hook; a plurality of handles affixed to the straps.

The straps may comprise elongated polymeric materials.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

It is an object of the present invention to provide a strength training apparatus for outdoor use with a hitch receiver and/or ground receiver (or receptor).

Figure 1:
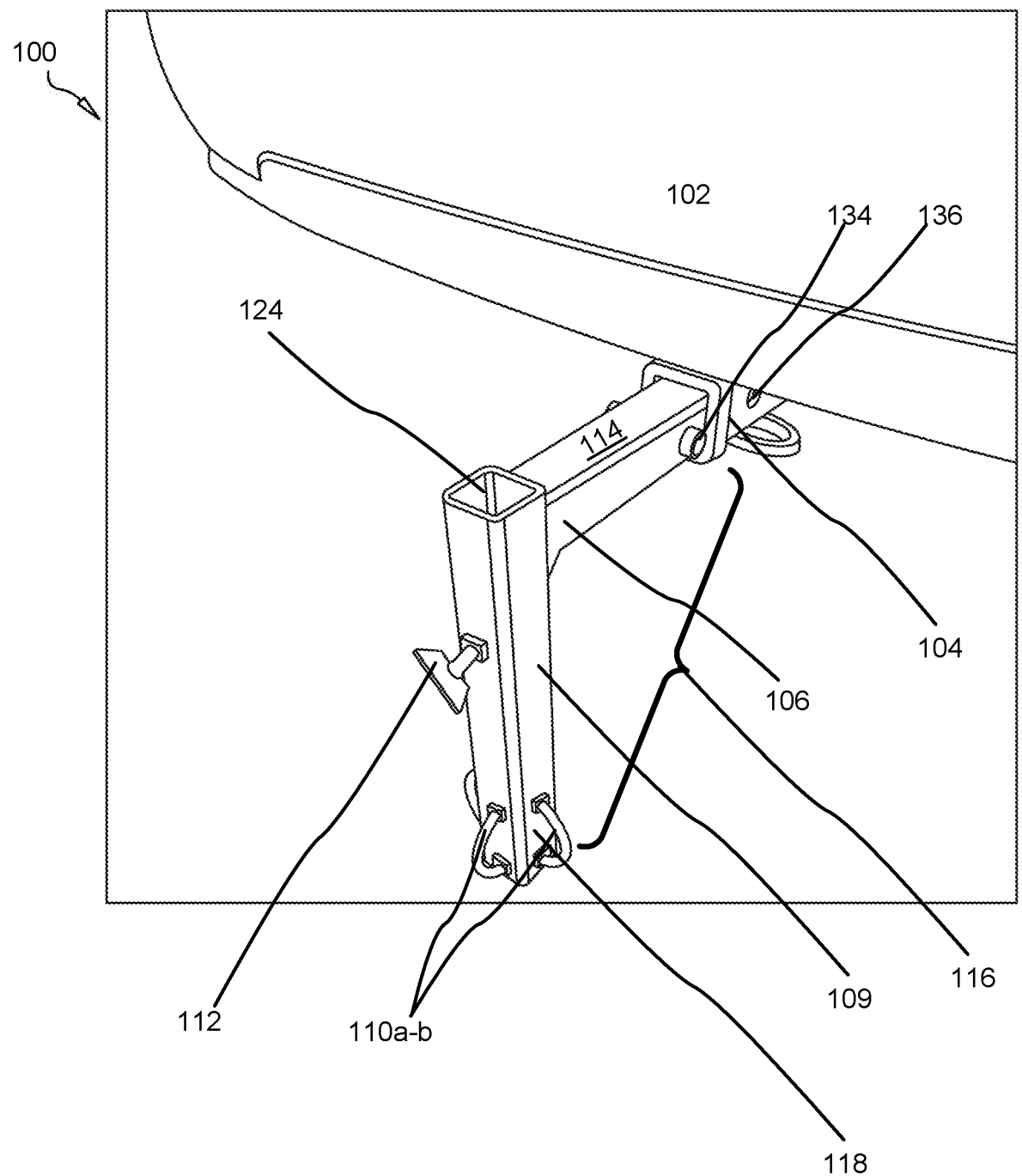
FIG. 1 is an isometric, environmental perspective view of a strength training apparatus for outdoor use with a hitch receiver in accordance with the present invention.

FIG. 1 is an isometric, environmental perspective view of a strength training apparatus for outdoor use with a hitch receiver in accordance with the present invention.

The hitch assembly 116 inserts into the tow bracket 104 mounted to the bottom of the vehicle 102. The hitch assembly 116 takes the place of the trailer hitch ball which would normally insert into the tow bracket 104. The hitch assembly 116 comprises an L-shaped bracket 106. The L-shaped bracket 106 comprises a cantilever 114 adapted to insert into the tow bracket 104 on an automobile 102. The L-shaped bracket 106 further comprises a vertical post 109 affixed at a proximal end to the cantilever 114. The distal end 118 of the vertical post 109 may be adapted to rest at or near a ground or subgrade surface in some embodiments, or to hang free in other embodiments.

A plurality of anchor points 110 circumscribe the distal end 118 of the vertical post 108. The vertical post 109 and cantilever 114 may be formed of angle iron, tubular components, or solid shafts. The vertical post 109 and cantilever 114 may be formed of steel, aluminum, titanium or alloy or polymeric materials.

The anchor points 110 may comprise steel loops affixed to the distal end 118 of the vertical post 108. Alternatively, the anchor points 110 may comprise a plurality of bores traversing the vertical post 109.

The L-shaped bracket 106 may also comprise one or more jack screws 112 adapted to form a friction fit with a cruciform 300, further described below, which is adapted to insert into the open top end 124 of the L-shaped bracket 106. The jack screws 112 may position on forward, side, or rear surfaces of the cantilever.

The apparatus 100 may comprise one or more annular, threaded skirts 134 which circumscribe a bore traversing the cantilever 114. These annular threaded skirts 134 are adapted to receive a threaded bolt which may traverse the cantilever 114 and the hitch through the bore 136. Alternatively, a depressible pin may substitute for the annular, threaded skirts 134 adapted to snaps into aperture 136 on the hitch receiver or ground receptor and secure the cantilever.

Figure 2:
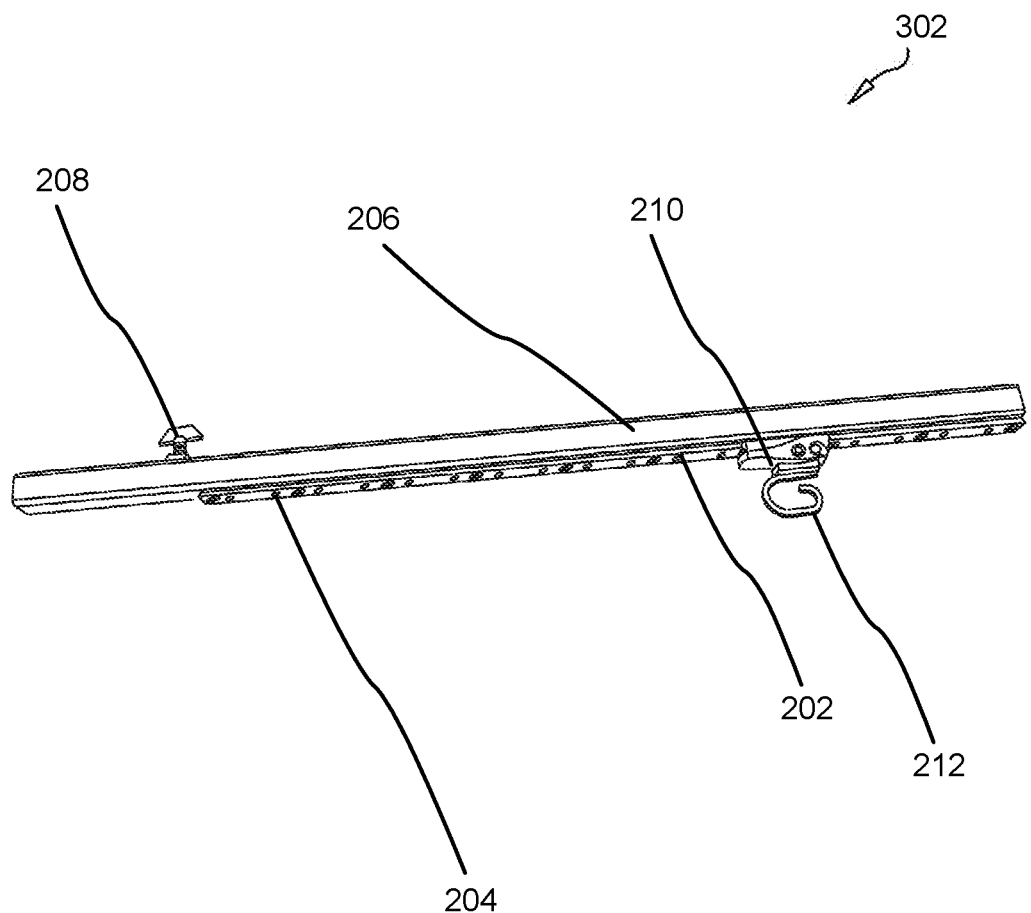
FIG. 2 is a top perspective view of a crossbeam of a strength training apparatus for outdoor use with a hitch or ground receiver in accordance with the present invention.

FIG. 2 is a top perspective view of a crossbeam 302 of a strength training apparatus for outdoor use with a hitch or ground receiver in accordance with the present invention.

The apparatus 100-500 may comprise a cross member (or crossbeam) 302. The cross member 302 may be formed from steel, alloy, metallic or polymeric components and may be tubular or sold. In various embodiments, the cross member 302 is square as shown from a top cross-sectioned view.

A track 202 runs across a surface of the cross member 302. The cross member 302 may be arcuate. The track 202 defines a plurality of bores 204 adapted to secure in place a shuttle 210 which travel on the track 202. The shuttle 210 may comprise an outwardly-protruding hook 212 adapted to detachable affix to one or more straps 504 further described below. In place of straps 504, rope, bands, elastomeric tubes, or chain may be used.

In various embodiments, the track 202 is affixed to the cross member 302, but is some embodiments, the track 202 is formed therewith. The cross member 302 may be formed as a single integrated piece with the cruciform. The cross member 302 (i.e., crossbeam) may comprise bores 204 traversing either the track 202, the post 206, or both. In some embodiments, the shuttle 210 is adapted to travel up and down the post 108.

In various embodiments, the track 202 runs from a ground surface to a predetermined upward height.

The cross member 302 may comprise one or more jack screws 208. The cross member 302 may insert into brackets 904 or studs.

Figure 3:
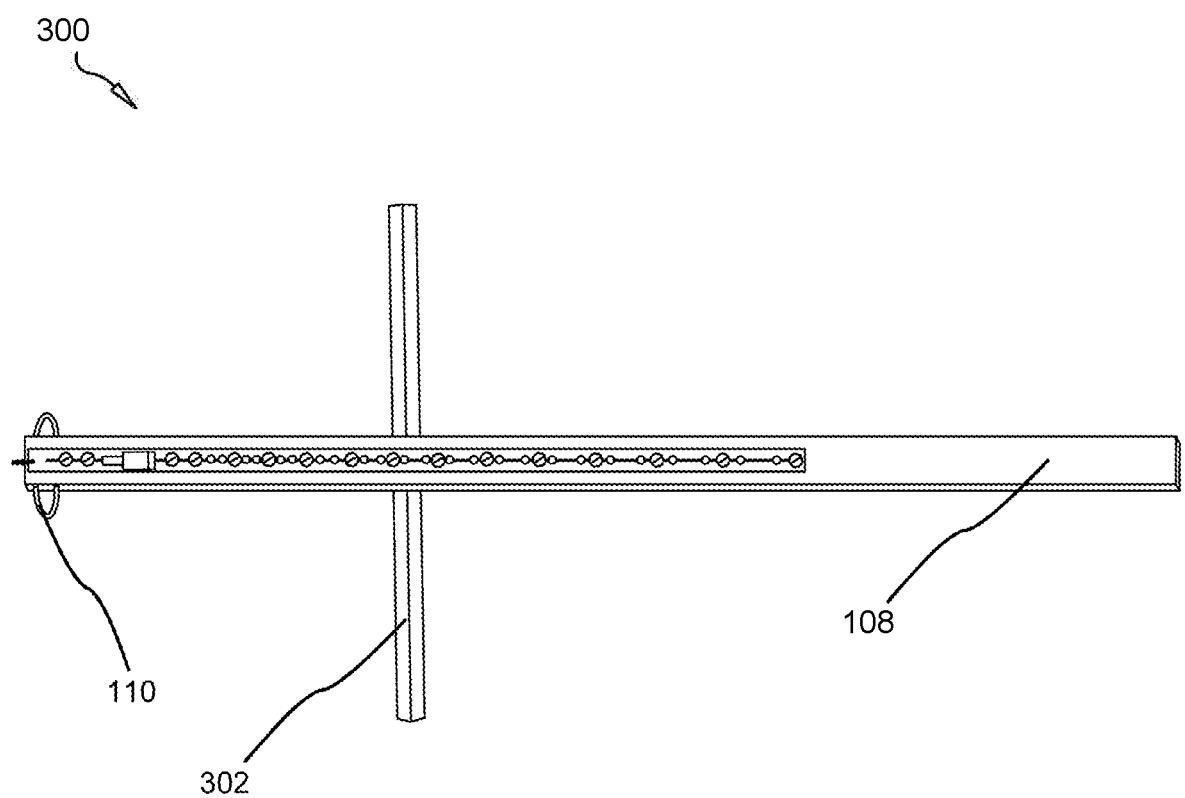
FIG. 3 is a top perspective view of a cruciform of a strength training apparatus for outdoor use with a hitch or ground receiver in accordance with the present invention.

FIG. 3 is a top perspective view of a cruciform of a strength training apparatus for outdoor use with a hitch receiver or ground receiver in accordance with the present invention.

The cruciform 300 comprises the upright 108 and a crossbeam 302 which affixes perpendicularly to the upright 108. The crossbeam 302 may comprise any rigid beam adapted to affixed using brackets, bolts, screw or other means known to those of skill in the art at, or near, a midpoint of the crossbeam 302.

Anchor points 110 may position toward the top of the upright 108 as shown.

Figure 4:
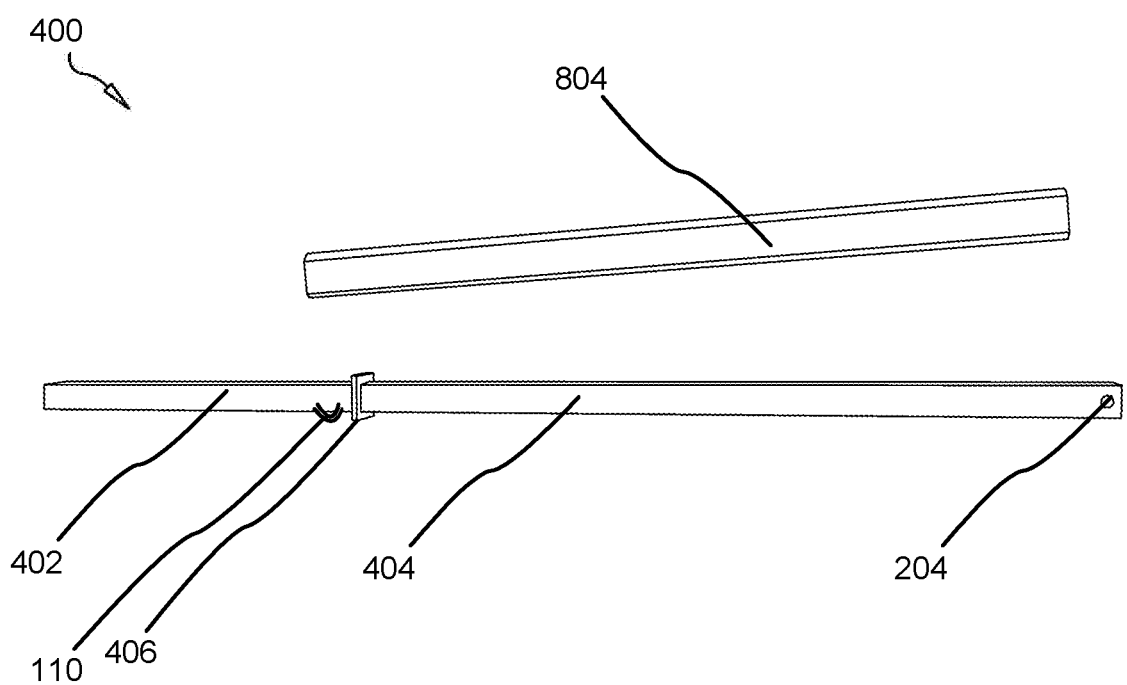
FIG. 4 is a side perspective view of a strength training apparatus for outdoor use with a ground receiver in accordance with the present invention.

FIG. 4 is a side perspective view of various upright components of a strength training apparatus for outdoor use 400 in accordance with the present invention.

In various embodiments, the upright 108 (i.e. "stipes") comprises a plurality of tubular components 402, 404, and 804 which detachably affix together. These components 402, 404 may telescope one from the other in some embodiments.

The upright components comprise a ground receiver 804, which is a hollow tubular and elongated components which inserts into a ground and/or subgrade surface. The ground receiver 804 is capped at one end with an end on the opposing side. The ground receiver is positioned within a subgrade such that the open top end disposes superiorly to the capped bottom end.

The elongated component 404 slidably inserts into the open top end of the ground receiver 804 and stops when the flange 406 comes into contact with the ground receiver 804. In this configuration, the upright component 402 rises superiorly to the remaining components above the ground surface and subgrade such that additional components forming the cruciform are attachable therewith.

Figure 5:
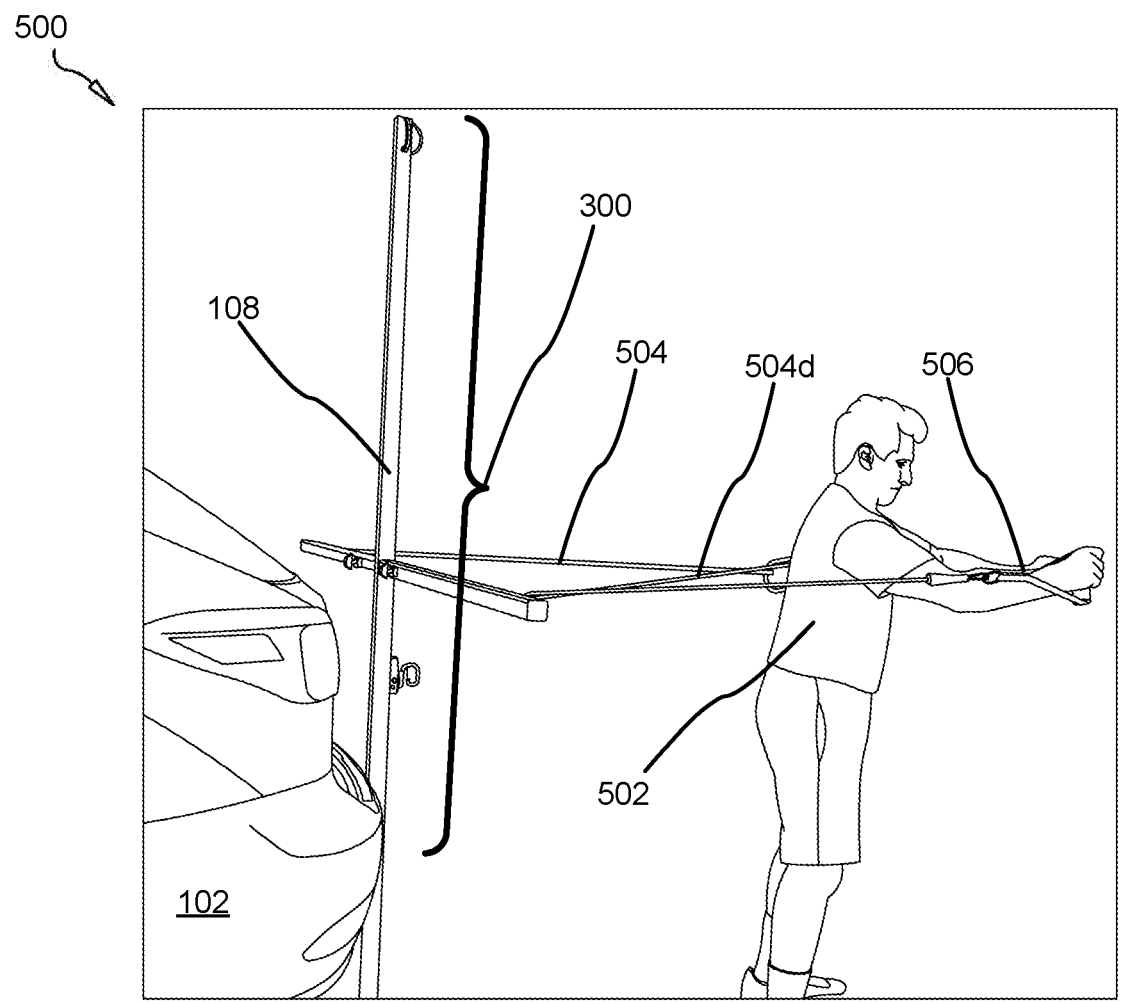
FIG. 5 is an environmental perspective view of a strength training apparatus for outdoor use with a hitch receiver in accordance with the present invention.
Figure 6:
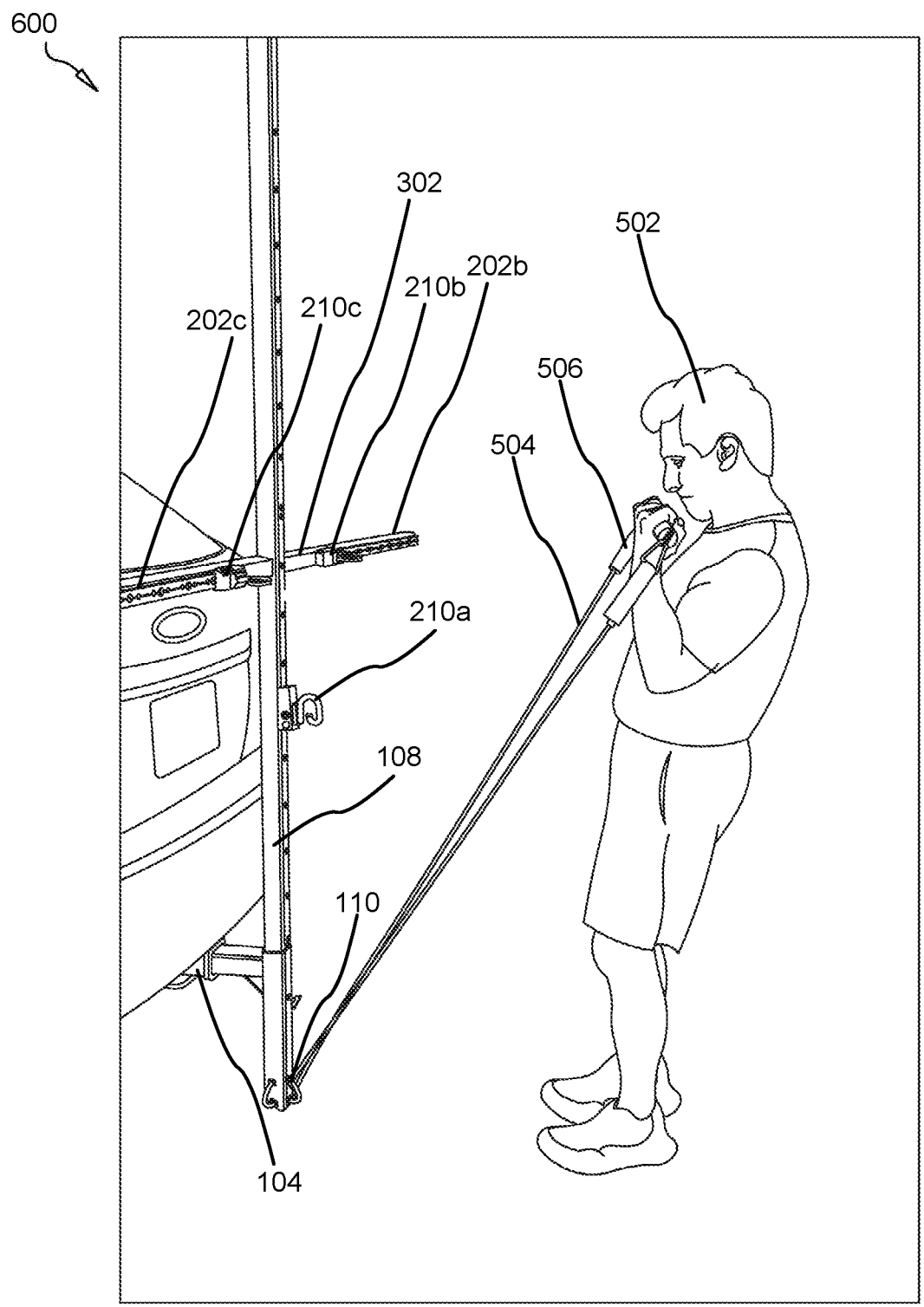
FIG. 6 is an environmental perspective view of a strength training apparatus for outdoor use with a hitch receiver in accordance with the present invention.

FIGS. 5-6 illustrate environmental perspective views of a strength training apparatus for outdoor use with a hitch receiver 500, 600 or ground receiver in accordance with the present invention.

In various embodiments, the apparatus 500 comprises a plurality of elongated straps 504 formed from flexible, polymeric, inelastic or elastic material(s). These straps 504 are adapted to selectively affix to any of the anchor points 110, the shuttle 210, or the crossbeam 302. A user 502 exercises using the apparatus 500. Handles 506 may affix to distal ends of the straps 504 for use in performing various exercises.

In various embodiments, the apparatus 500 includes a cross strap 504c adapted to pull the strap 504 inwardly.

As shown in FIG. 6, the crossbeam 302 may also comprise a plurality of tracks 202b-c upon which additional shuttles 210b-c travel. Like shuttle 210a, shuttles 210b-c may travel on the crossbeam 302 itself rather than tracks 202b-c. The shuttles 210b-c comprise hooks 212 for anchoring straps 504.

In some embodiments, the apparatus 600 comprises a plurality of crossbeams 302.

Figure 7:
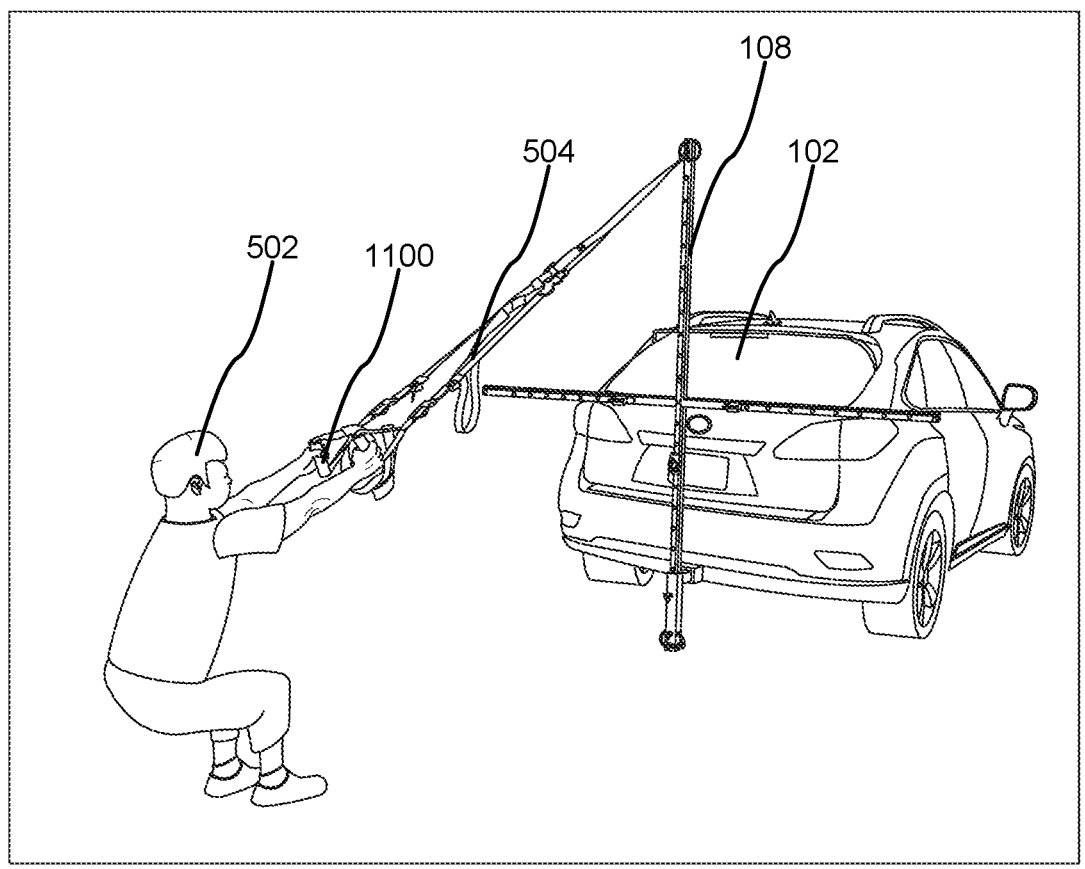
FIG. 7 is an environmental perspective view of a strength training apparatus for outdoor use with a hitch receiver in accordance with the present invention.

FIG. 7 is an environmental perspective view of a strength training apparatus for outdoor use with a hitch receiver 700 in accordance with the present invention.

As shown, straps 504 may affix to anchor points 110 at a top/distal end of the upright 108.

Figure 8:
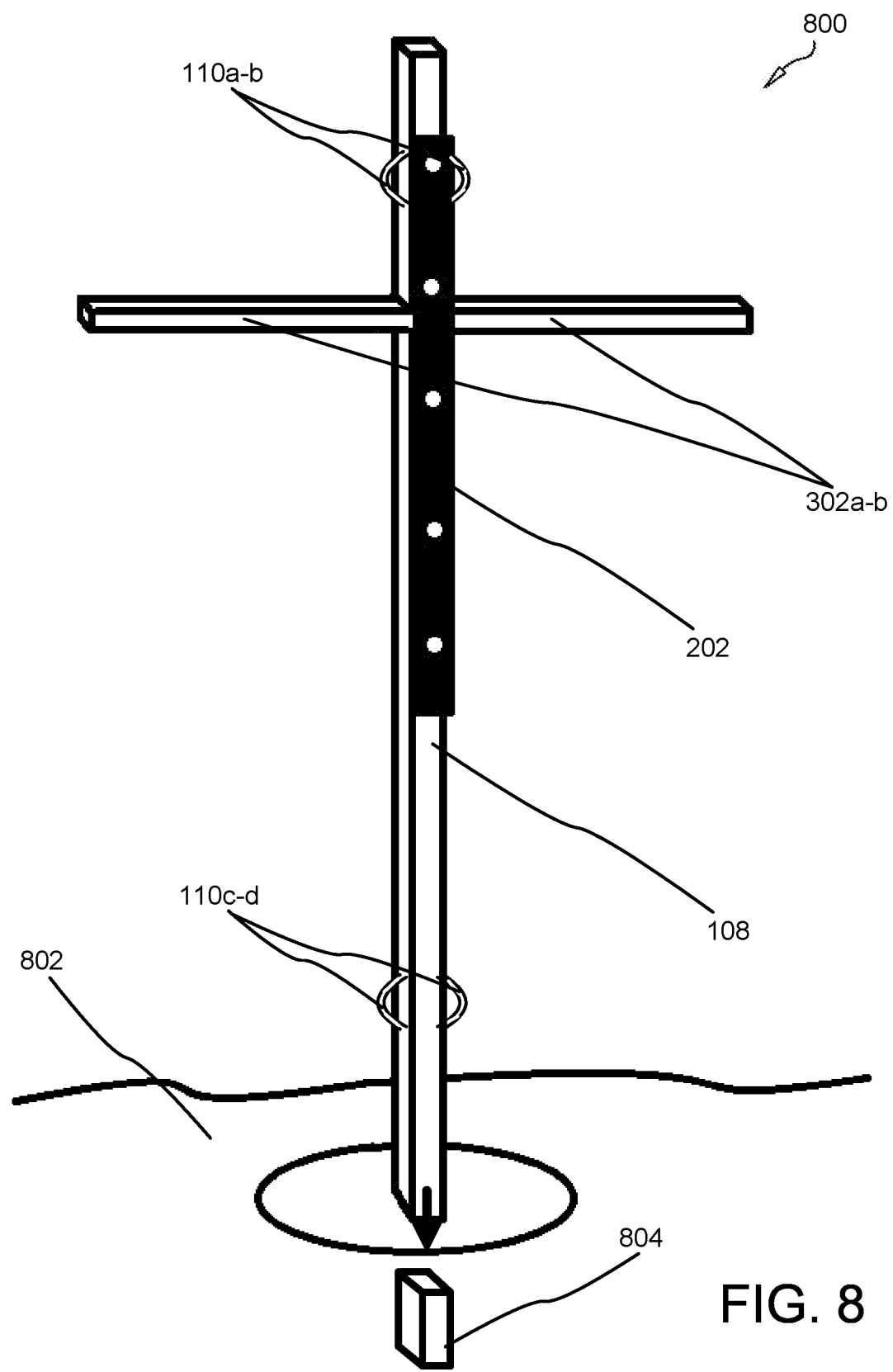
FIG. 8 is an environmental perspective view of a strength training apparatus for outdoor use with a ground receiver in accordance with the present invention.

FIG. 8 is an environmental perspective view of a strength training apparatus 800 for outdoor use in accordance with the present invention.

The apparatus 800 comprises an upright 108 (or upright) joined to a track 202. Anchor points 110 position at the top of the upright 108 and may also position on the lower half of the upright 108, as well as at lateral (or distal ends) of the crossbeam(s) 302.

In the shown embodiment, the upright 108 inserts into a ground or subgrade 802 surface. The upright 108 may position within a tubular, rectangular, receiver within the ground or the upright 108 may be affixed to a stud 402 which inserts into the ground receptor 804. The upright 108 and stud 402 may be formed as a single integrated piece.

In various embodiments, the track 202 is oriented perpendicularly to the crossbeam(s) 302 and overlaps the same on the upright 108.

In various embodiments, a rectangular receiver 804 positions within the ground surface configured to receive one of the upright 108, the stud 402, and/or the cruciform. The receiver 804 may jut upwardly slightly from the ground surface 802.

Figure 9:
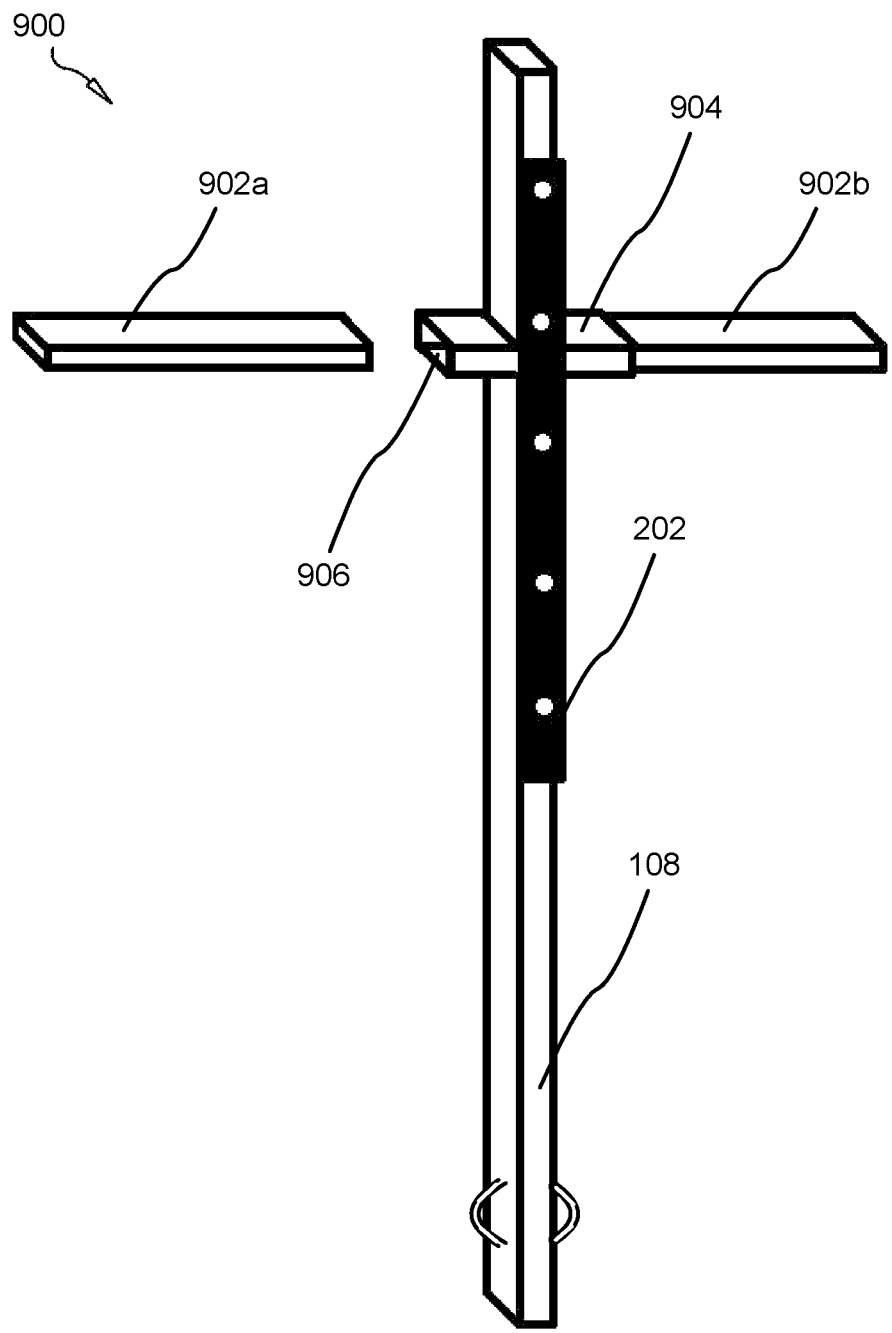
FIG. 9 is a perspective view of a strength training apparatus for outdoor use in accordance with the present invention.

FIG. 9 is a perspective view of a strength training apparatus for outdoor use 900 in accordance with the present invention.

In various embodiments, the apparatus 900 comprises a plurality of crossbeams 902 which insert into a bracket 904 affixed to, or welded to, the upright 108. The brackets may also be called studs. In various embodiments, the bracket 904 defines one or more lateral recesses 906 for receiving the crossbeams 902. These lateral recesses may be defined by studs jutting laterally from the upright 904.

Figure 10:
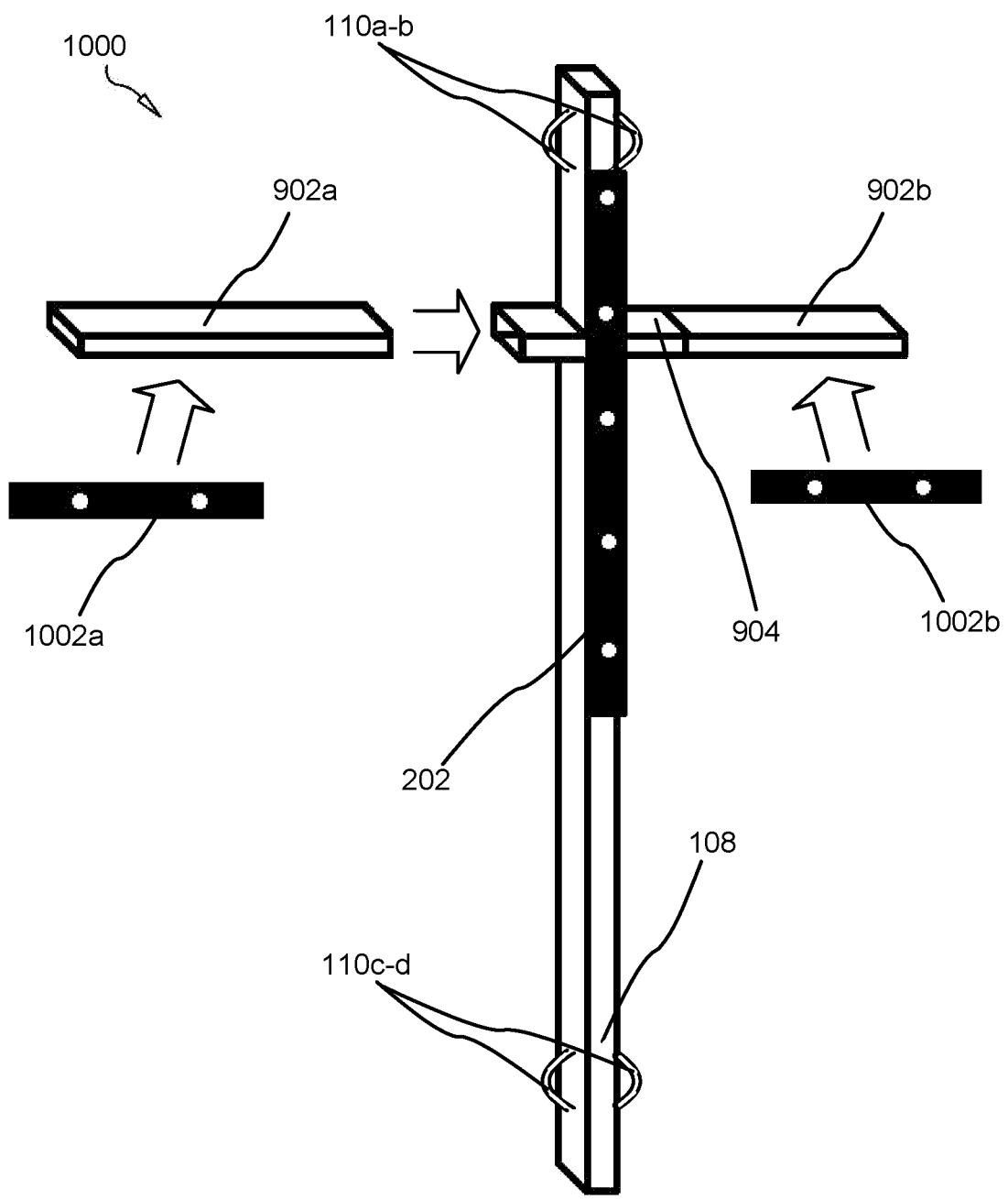
FIG. 10 is a perspective view of a strength training apparatus for outdoor use in accordance with the present invention.

FIG. 10 is a perspective view of a strength training apparatus for outdoor use 1000 in accordance with the present invention.

In various embodiments, tracks 1002 affix to a forward surface of the crossbeam(s) 902.

Figure 11:
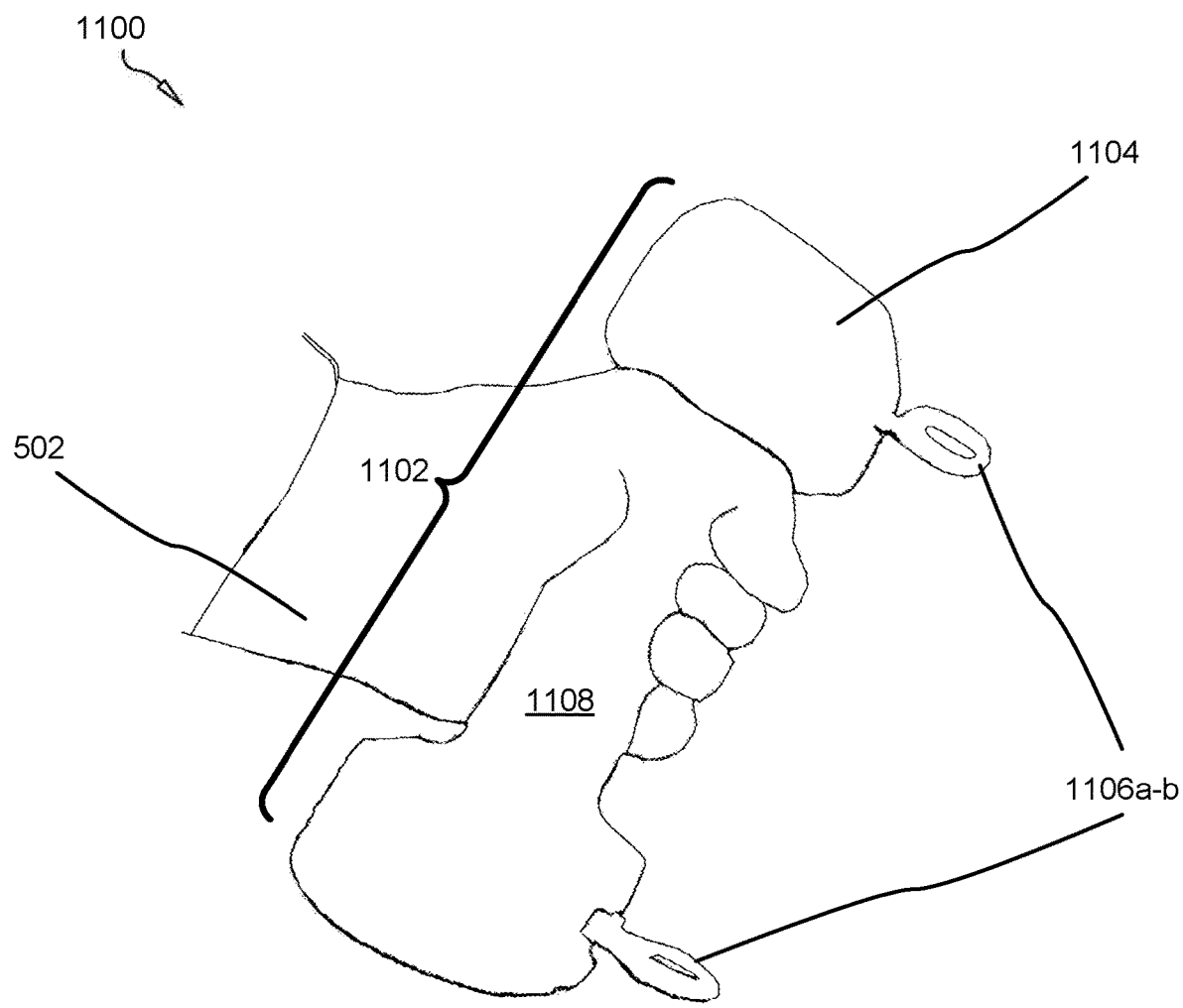
FIG. 11 is an environmental, perspective view of a handle of a strength training apparatus for outdoor use in accordance with the present invention.

FIG. 11 is an environmental perspective view of a handle 1100 of a strength training apparatus for outdoor use in accordance with the present invention.

In various embodiments, the handle 1100 comprises a dumbbell 1102, or any weighted handles, having weighted upper and lower terminal ends 1104 as shown. The handle 1100 comprises, or consists of, two attachment points 1106a-b, which are both affixed on the peripheral outer edge of a terminal end 1104 such that the attachment points 1106a-b are in parallel with each other and a center shaft 1108 of the handle 1100 interconnecting the terminal ends 1104. The attachment points 1106 comprise uninterrupted loops adapted to detachable affix to the straps 504.

Figure 12:
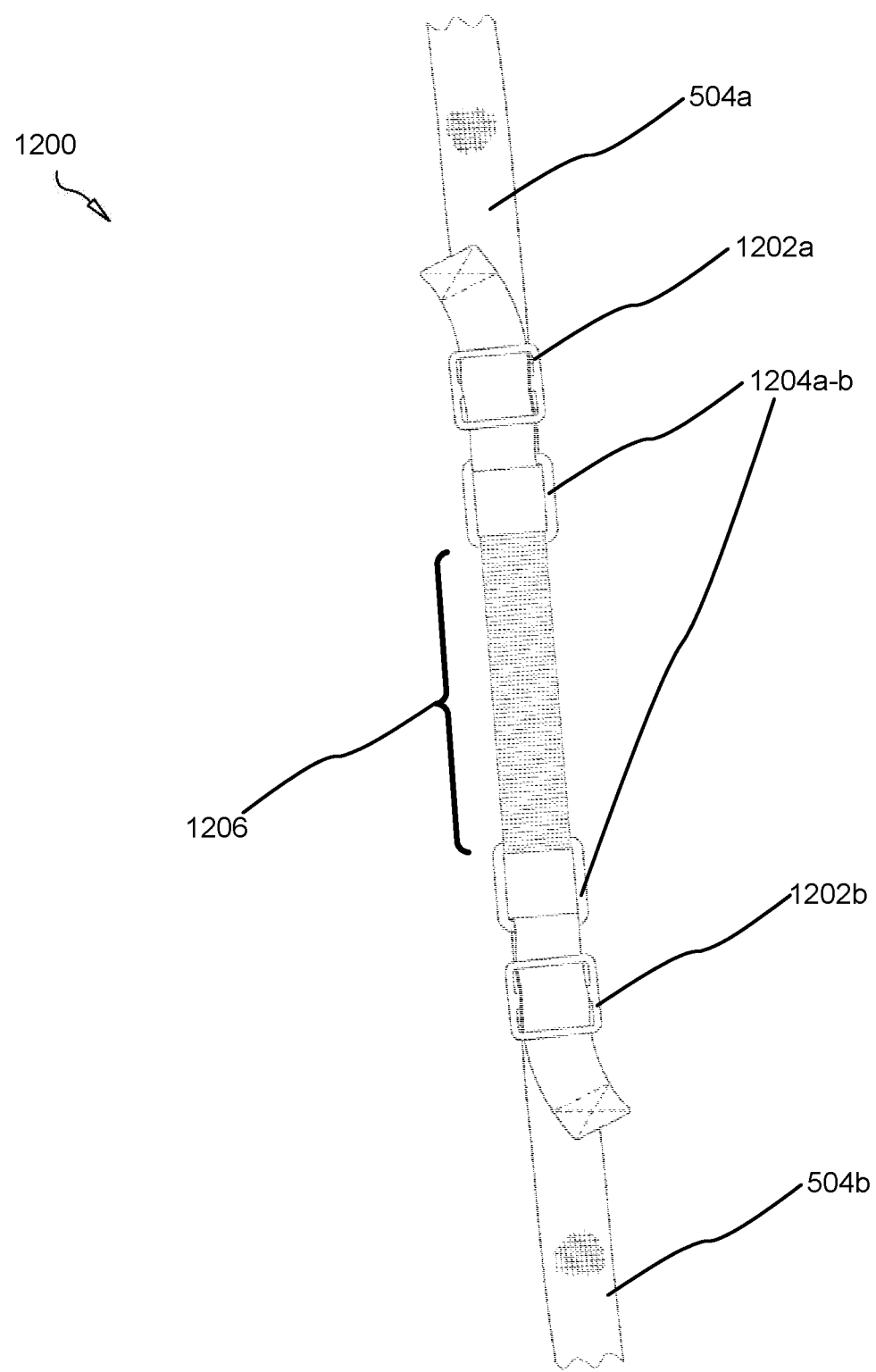
FIG. 12 is a top perspective view of a strap of a strength training apparatus for outdoor use in accordance with the present invention.

FIG. 12 is a top perspective view of a strap 1200 of a strength training apparatus for outdoor use in accordance with the present invention.

In various embodiments, the strap 504 is partitioned into two halves 504a-b and an intermediate strap 1206 which is positioned between the straps 504a and 504b. This intermediate strap 1206 is detachable using D-rings 1204, carabiners, or other fasteners known to those of skill in the art. The intermediate strap 1206 is meant to be detachable and disposable. In some variations a cross strap affixes to an anchor point 110 on the apparatus 100-500 at a proximal end. The distal end of the cross strap may slidably affix to the intermediate strap 1206. The cross strap may travel up and down along the length of the intermediate strap 1206 such that the intermediate strap 1206, rather than the strap 504, is adapted in some embodiments to withstand the friction and wear caused by the cross strap 504 acting upon it. The intermediate strap 1206 may be formed from polymeric materials or organic materials such as leather. The intermediate strap 1206 may be formed from materials with low friction surfaces adapted to allow the cross strap 504 to travel freely on the intermediate strap 1206 or textured surfaces adapted to prevent travel (and wear) of the cross strap 504 against the intermediate strap 1206.

Figure 13A:
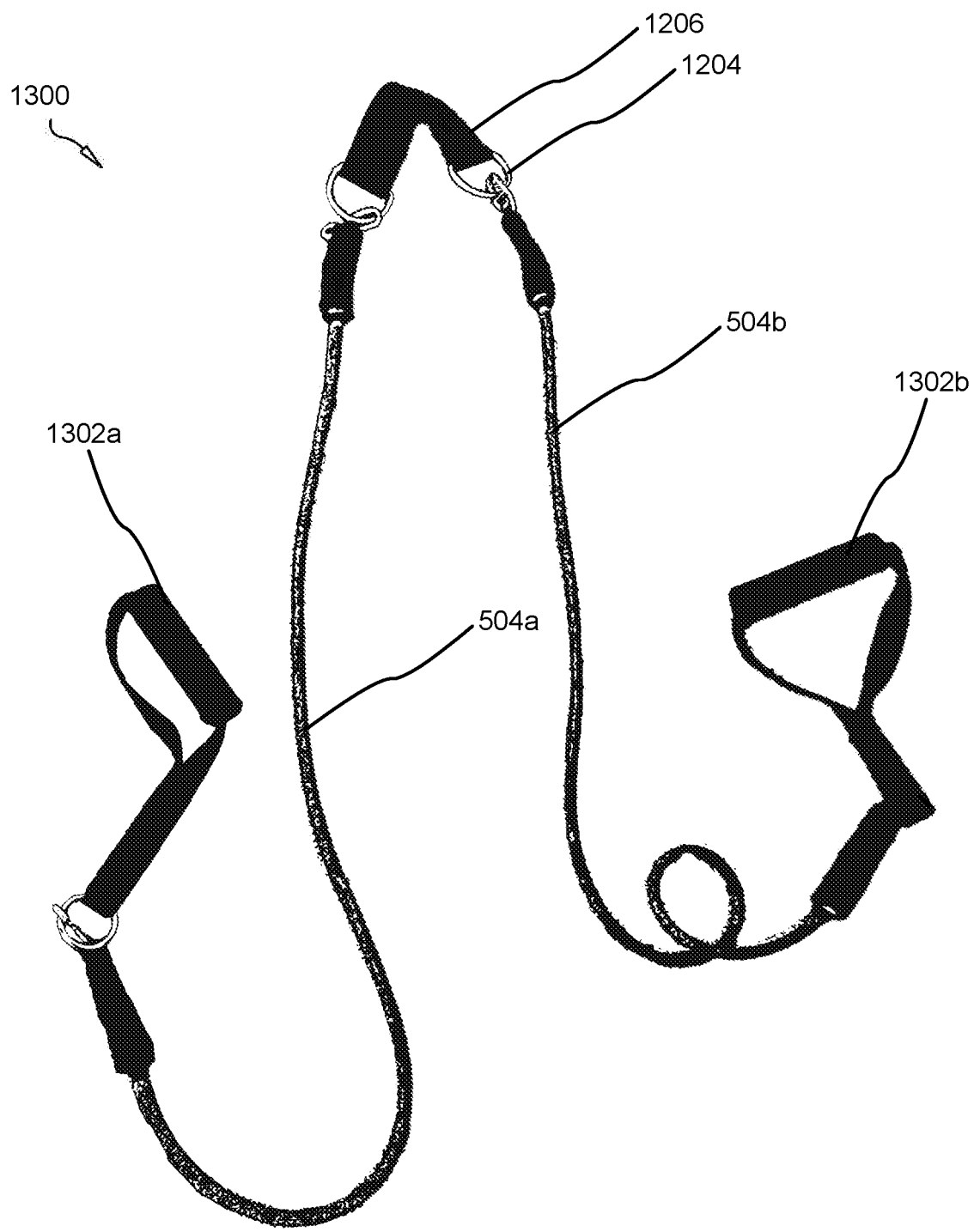
FIG. 13A is a top perspective view of a strap of a strength training apparatus for outdoor use in accordance with the present invention.

FIG. 13A is a top perspective view of a strap 1300 of a strength training apparatus for outdoor use in accordance with the present invention.

The strap 1300 comprises an intermediate strap 1206 attached at both terminal ends to straps 504a-b. Handles 1302a-b dispose at the terminal ends of the straps 504a-b. The straps 504a-b may comprise elastic tubing as shown.

Figure 13B:
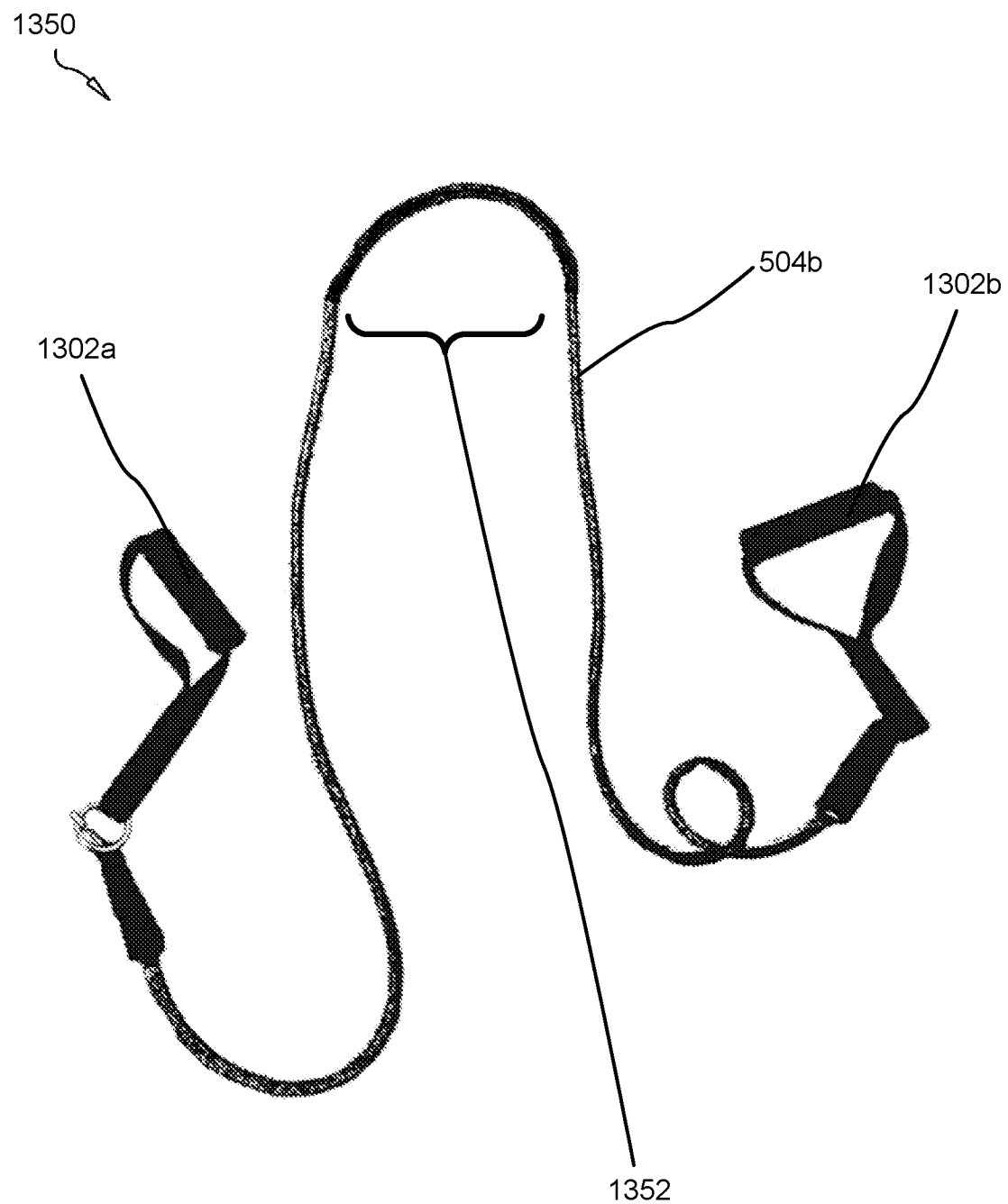
FIG. 13B is a top perspective view of a strap of a strength training apparatus for outdoor use in accordance with the present invention.

FIG. 13B is a top perspective view of a strap 1350 of a strength training apparatus for outdoor use in accordance with the present invention.

Unlike strap 1300, strap 1350 is a single, elongated, flexible strap or tube affixed at distal and proximal ends to handles 1302. The strap 1350 in this embodiment comprises a flexible sleeve 1352 circumscribing a medial portion of the strap 1350. This flexible sleeve 1350 may be slipped onto the strap 1350, heat-pressed onto the strap 1350, threaded onto the strap 1350, or otherwise applied using means known to those of skill in the art. In some embodiments, the flexible sleeve 1350 is a polymeric coating and/or adhesive which is applied to the strap 1350. In various embodiments, the flexible sleeve is formed from polymeric or organic materials, such as nylon or leather.

Figure 14:
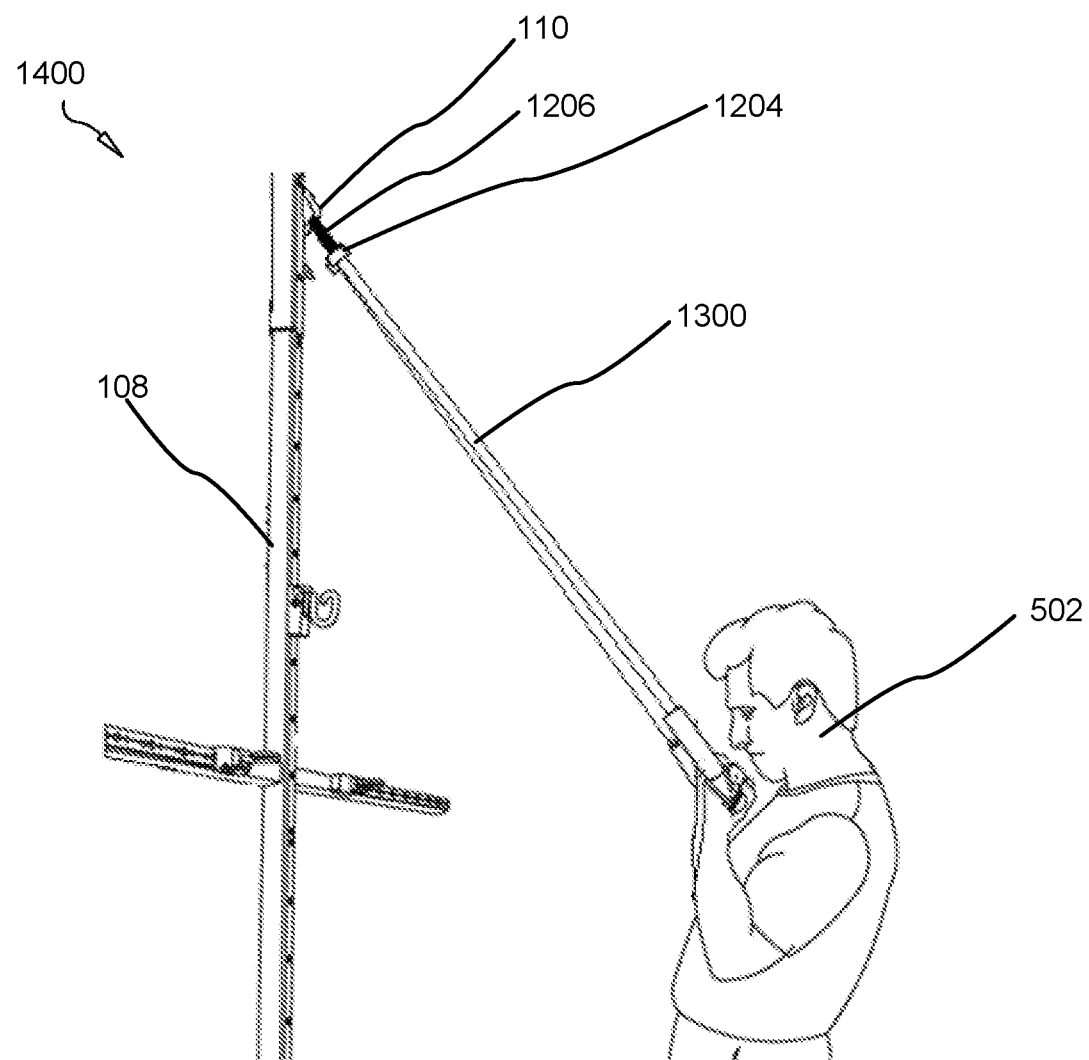
FIG. 14 is an environmental perspective view of a strength training apparatus for outdoor use with a hitch or ground receiver in accordance with the present invention.

FIG. 14 is an environmental perspective view of a strength training apparatus 1400 for outdoor use with a hitch or ground receiver in accordance with the present invention.

In various embodiments, the intermediate strap 1206 positions within an anchor point 110 or shuttle 210 and is adapted to prevent wear occasioned by the anchor point 110 on the intermediate strap 1206.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A strength training apparatus for outdoor use comprising:
   an L-shaped bracket having a cantilever adapted to insert into a hitch receiver on an automobile, the L-shaped bracket further comprising:
      a vertical post affixed at a proximal end to the cantilever, the vertical post comprising a distal end and an open top end adapted to receive an upright;
      one or more jackscrews adapted to form a friction fit with a cruciform;
   a cruciform adapted to insert into the open top end, the cruciform comprising an upright and one or more crossbeams, each of the one or more crossbeams comprising a track spanning the one or more crossbeams within which a shuttle travels;
   a second shuttle adapted to travel vertically on the upright, the second shuttle comprising a hook adapted to detachably affix to one or more straps;
   one or more straps adapted to detachably affix to one or more of an anchor point and a hook;
   a plurality of handles affixed to the one or more straps.

2. The strength training apparatus of claim 1, wherein the vertical post juts downwardly from the cantilever.

3. The strength training apparatus of claim 1, wherein the L-shaped bracket comprises: a plurality of anchor points circumscribing a distal end of the vertical post, the anchor points comprising steel loops; and one or more annular threaded skirts.

4. The strength training apparatus of claim 1, wherein the upright comprises a plurality of anchor points circumscribing a distal end thereof.

5. The strength training apparatus of claim 1, wherein the one or more crossbeams comprises two or more shuttles adapted to travel horizontally on the one or more crossbeams.

6. The strength training apparatus of claim 1, wherein the upright comprises one or more jack screws.

7. The strength training apparatus of claim 1, wherein:
   the vertical post comprises one or more jack screws; and
   the crossbeam and track spanning the one or more crossbeams are formed as a single, integrated piece.

8. The strength training apparatus of claim 1, wherein the one or more straps comprise elongated polymeric materials.

9. A strength training apparatus for outdoor use comprising:
   a tubular ground receiver comprises an elongated metal alloy tube adapted to be recessed into a subgrade surface, the ground receiver having a closed bottom end and an open top end adapted to receive an upright of a cruciform;
   a cruciform adapted to insert into the open top end, the cruciform comprising an upright and one or more crossbeam(s);
   wherein the one or more crossbeams each comprises a shuttle adapted to travel horizontally on the one or more crossbeam(s);
   a second shuttle adapted to travel vertically on the upright, the second shuttle comprises a hook adapted to detachably affix to one or more straps;
   one or more straps adapted to detachably affix to one or more of an anchor point and a hook;
   a plurality of handles affixed to the one or more straps; and
   wherein the upright comprises a plurality of anchor points circumscribing a distal end thereof.

* * * * *